United States Patent
Park et al.

(10) Patent No.: US 11,352,005 B2
(45) Date of Patent: Jun. 7, 2022

(54) CRUISE OPERATION FUEL EFFICIENCY IMPROVEMENT CONTROL METHOD USING SYSTEM COOPERATION AND CRUISE CONTROL SYSTEM

(71) Applicants: HYUNDAI MOTOR COMPANY, Seoul (KR); KIA MOTORS CORPORATION, Seoul (KR)

(72) Inventors: Sun-Young Park, Busan (KR); Oh-Eun Kwon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 111 days.

(21) Appl. No.: 16/894,443

(22) Filed: Jun. 5, 2020

(65) Prior Publication Data
US 2021/0253098 A1    Aug. 19, 2021

(30) Foreign Application Priority Data
Feb. 17, 2020    (KR) .......................... 10-2020-0018887

(51) Int. Cl.
*G05D 1/00* (2006.01)
*B60W 30/14* (2006.01)
*B60W 30/18* (2012.01)

(52) U.S. Cl.
CPC .... *B60W 30/146* (2013.01); *B60W 30/18018* (2013.01); *B60W 30/18072* (2013.01);
(Continued)

(58) Field of Classification Search
CPC ......... B60W 30/146; B60W 30/18018; B60W 30/18072; B60W 30/18109;
(Continued)

(56) References Cited

U.S. PATENT DOCUMENTS 8,406,984 B2    3/2013  Glugla et al.
10,407,064 B2 *  9/2019  Lee ....................... B60W 10/02
(Continued)

FOREIGN PATENT DOCUMENTS

| JP | 6367516 B2 * | 8/2018 | |
| KR | 10-2017-0107245 | 9/2017 | |
| WO | WO-2019088901 A * | 5/2019 | ........... F16H 37/046 |

*Primary Examiner* — Hunter B Lonsberry
*Assistant Examiner* — Daniel M. Robert
(74) *Attorney, Agent, or Firm* — Fox Rothschild LLP

(57) ABSTRACT

A cruise operation fuel efficiency improvement control method, the method may include detecting, by an engine control unit, a cruise Resume request during a coasting running state of a vehicle; controlling a NCC Cruise Control which performs a cruise torque control of the vehicle after performing a control of an Electronic Stability Control (ESC) which sets a vehicle speed to a cruise target speed followed by a control of a transmission control unit, when the coasting running is recognized as a Neutral Control Coasting (NCC); and controlling a SSC Cruise Control which performs the cruise torque control of the vehicle after performing the control of the Electronic Stability Control (ESC) which sets the vehicle speed to the cruise target speed followed by the control of the transmission control unit in a driving state of an engine, when the coasting running is recognized as a Start Stop Control (SSC).

18 Claims, 5 Drawing Sheets

(52) U.S. Cl.
CPC ... *B60W 30/18109* (2013.01); *B60K 2310/30* (2013.01); *B60W 2520/10* (2013.01)

(58) Field of Classification Search
CPC .. B60W 2520/10; B60W 30/14; B60W 10/02; B60W 10/06; B60W 10/10; B60W 10/18; B60W 20/00; B60W 40/105; B60W 2530/13; B60W 2710/028; B60W 2710/0644; B60W 2720/10; B60Y 2200/92; B60Y 2300/14; B60Y 2300/18016; B60Y 2300/18066; B60K 2310/30
See application file for complete search history.

(56) References Cited

U.S. PATENT DOCUMENTS

| | | | |
|---|---|---|---|
| 2007/0038358 A1* | 2/2007 | Bauerle | F02D 41/16 701/93 |
| 2011/0035135 A1* | 2/2011 | Schwalm | B60W 10/08 701/110 |
| 2014/0156163 A1* | 6/2014 | Shin | B60W 10/184 701/94 |
| 2017/0080931 A1* | 3/2017 | D'Amato | B60W 30/16 |
| 2017/0267235 A1 | 9/2017 | Lee et al. | |

* cited by examiner

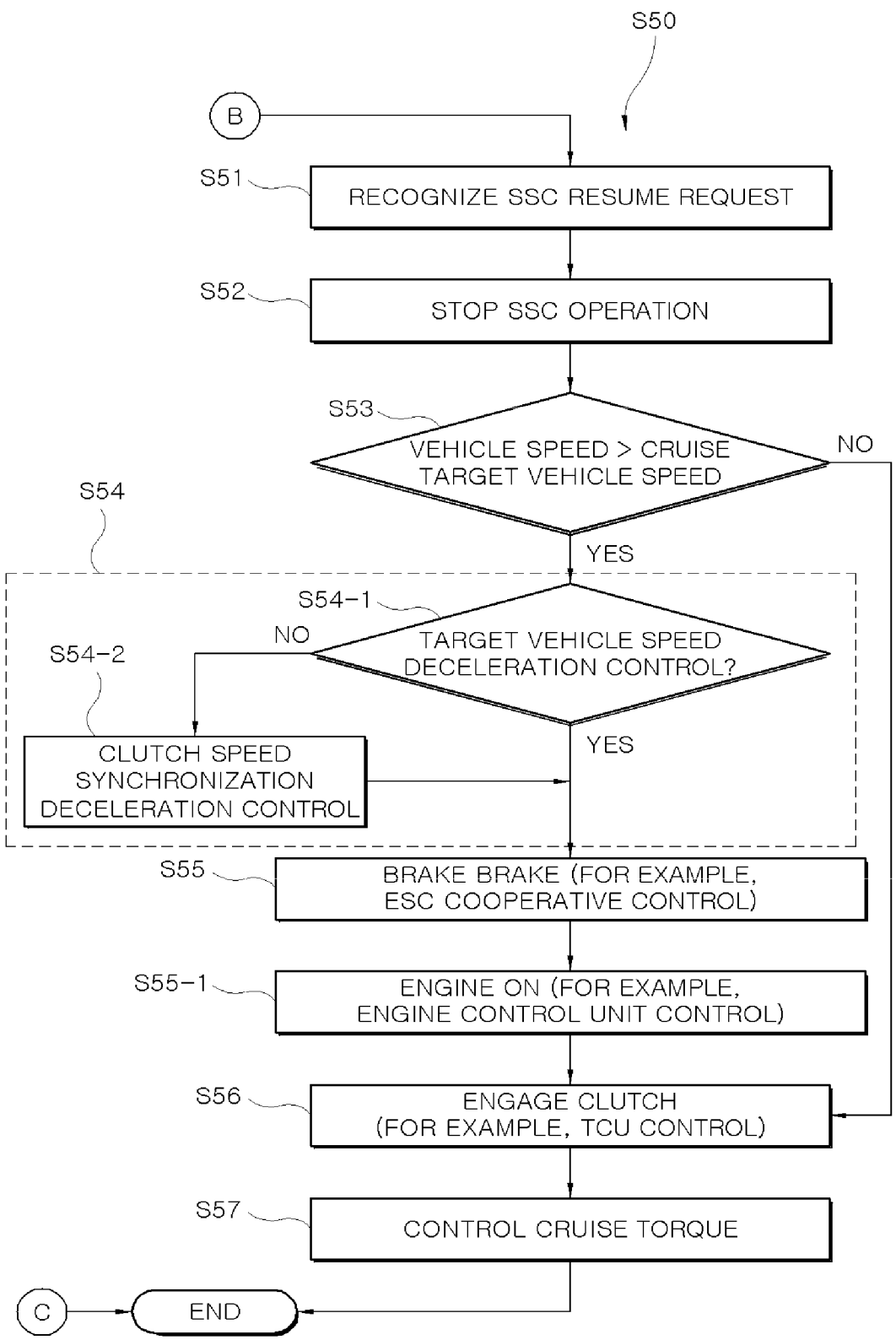

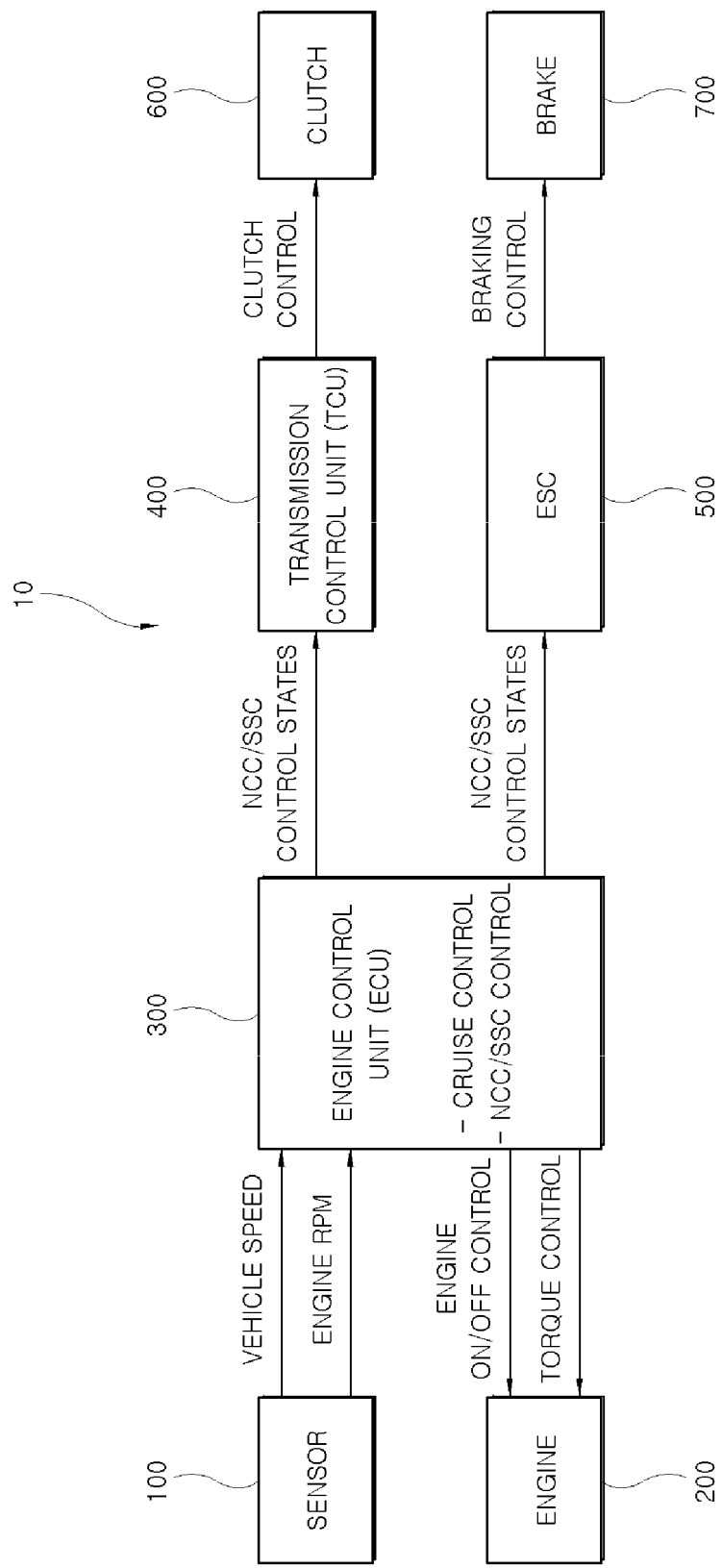

CRUISE OPERATION FUEL EFFICIENCY IMPROVEMENT CONTROL METHOD USING SYSTEM COOPERATION AND CRUISE CONTROL SYSTEM

CROSS-REFERENCE TO RELATED APPLICATION

The present application claims priority to and the benefit of Korean Patent Application No. 10-2020-0018887, filed on Feb. 17, 2020, which is incorporated herein by reference in its entirety.

TECHNICAL FIELD

The present disclosure relates to a cruise operation fuel efficiency improvement control.

BACKGROUND

The statements in this section merely provide background information related to the present disclosure and may not constitute prior art.

Recently, an iMT-mounted vehicle and a 48V system vehicle apply a Cruise Control in order to improve vehicle fuel efficiency.

For example, the 48V system vehicle is a mild hybrid electric vehicle having a 48V MHSG system. In the iMT-mounted vehicle, an intelligent Manual Transmission (iMT) refers to a manual transmission in which a Transmission Control Unit (TCU) may electronically control to connect and disconnect a clutch without a clutch pedal.

In addition, the Cruise Control means a driver assistance/support system for improving the driver's convenience, and fixes a vehicle speed to the speed desired by the driver to enable the vehicle to run while maintaining that speed even without depressing an accelerator pedal.

Particularly, the iMT-mounted vehicle and the 48V system vehicle further improve vehicle fuel efficiency by connecting the NCC and SSC running states of the vehicle to the Cruise Control. In this case, the Neutral Control Coasting (NCC) improves fuel efficiency by blocking transmission power (clutch open) upon coasting running, and the Start Stop Control (SSC) improves fuel efficiency by blocking the transmission power (clutch open) and stopping an engine upon coasting running. In addition, the iMT-mounted vehicle may implement the NCC and the SSC by applying an iMT capable of a clutch control of the TCU.

For example, the iMT-mounted vehicle and the 48V system vehicle which apply the Cruise Control perform NCC or SSC release→clutch lock→engine On (corresponding to only the SSC) and a cruise torque control at the cruise operation request of the driver during the NCC or SSC operation. In this case, "→" means the proceeding sequence of the operation.

Accordingly, the iMT-mounted vehicle and the 48V system vehicle which apply the Cruise Control may maximize fuel efficiency upon actual roadway running by using the driving condition of the driver, surrounding traffic situations, roadway information, and the like, rather than controlling only a vehicle system in order to eliminate the difference between certified fuel efficiency and fuel efficiency upon the actual roadway running by connecting the Cruise Control to the NCC and the SSC.

However, a logic strategy, which does not distinguish the condition difference between a Resume operation and a Resume from above operation when entering the NCC or SSC cruise during the existing NCC or SSC-connected Cruise Control, is applied, thereby resulting in unnecessary power waste.

For example, the NCC cruise entry wastes engine power by immediately engaging a clutch by increasing an engine Revolution Per Minute (RPM) to a transmission stage clutch speed immediately upon a Resume request, and the SSC cruise entry wastes an engine driving force by immediately engaging the clutch by turning on the engine immediately upon the Resume request, and increasing the engine RPM to the transmission stage clutch speed.

This reason is because the Resume operation applies an algorithm which sets a previous target speed to a current target speed to immediately turn on the engine and to increase the engine RPM to the RPM to be synchronized by pressing a Resume button in a cruise pause state.

Such a Resume algorithm is further enhanced in the Resume from above operation, which immediately turns on the engine and increases the engine RPM to the RPM to be synchronized in a situation where the current vehicle speed of the vehicle is greater than the previous target speed, which is because the Resume from above operation does not consider the direct deceleration request of the driver who has no willingness to accelerate because the clutch RPM at the transmission side is greater than the RPM to be synchronized.

Accordingly, the existing logic strategy of the SSC-based Cruise Control inevitably causes unnecessary engine driving and engine power waste.

SUMMARY

The present disclosure provides a cruise operation fuel efficiency improvement control method using a system cooperation and a cruise control system, which may enter a clutch control of a Transmission Control Unit (TCU) after a vehicle speed control using an Electronic Stability Control (ESC) upon the Resume operation request for entering a cruise during the NCC or SSC operation, thereby reducing the unnecessary engine driving in the SSC while reducing the power waste in the NCC in response to the direct deceleration request of the driver who has no willingness to accelerate to improve fuel efficiency.

A cruise operation fuel efficiency improvement control method according to the present disclosure for achieving the object includes a coasting running cooperative control which controls, by an engine control unit, a cruise torque of an engine by engaging a clutch in a state where a vehicle speed is decelerated under a control of a brake in the case of a NCC running or controls the cruise torque of the engine by engaging the clutch in a state where the engine is driven after the vehicle speed is decelerated under the control of the brake in the case of a SSC running, when a cruise Resume request of a vehicle is detected.

In addition, a cruise operation fuel efficiency improvement control method according to the present disclosure for achieving the object includes detecting, by an engine control unit, a cruise Resume request during a coasting running state of a vehicle; controlling a NCC Cruise Control which performs a cruise toque control of the vehicle after performing a control of an ESC which sets a vehicle speed to a cruise target speed followed by a control of a transmission control unit, when the coasting running is recognized as a NCC; and controlling a SSC Cruise Control which performs the cruise toque control of the vehicle after performing the control of the ESC which sets the vehicle speed to the cruise target speed followed by the control of the transmission control unit in a driving state of an engine, when the coasting running is recognized as a SSC.

In one form of the present disclosure, the ESC controls a brake in cooperation with the engine control unit, and the transmission control unit controls a clutch in cooperation with the engine control unit.

In one form of the present disclosure, the controlling of the NCC Cruise Control is performed as stopping the NCC operation by recognizing the cruise Resume request as a NCC Resume request, confirming a current vehicle condition for entering a cruise with a current vehicle speed and a target vehicle speed, performing a cooperative control between the ESC and the transmission control unit, and controlling an engine for the cruise torque control.

In one form of the present disclosure, the cruise torque control is performed after the cooperative control at a value at which the current vehicle speed is greater than the target vehicle speed or performed without the cooperative control at a value at which the current vehicle speed is smaller than the target vehicle speed.

In one form of the present disclosure, the cooperative control is performed as performing, by the ESC, a braking by controlling a brake based on an ESC cooperative control request, and engaging, by the transmission control unit, a clutch by controlling the clutch based on a transmission control unit cooperative control request.

In one form of the present disclosure, the ESC implements vehicle deceleration by controlling the brake until the current vehicle speed reaches the target vehicle speed, and the vehicle deceleration is implemented by lowering the current vehicle speed or implemented by lowering a transmission stage clutch speed at the current vehicle speed to the speed which is synchronized with a current engine Revolution Per Minute (RPM), by setting the target vehicle speed to a cruise target vehicle speed.

In one form of the present disclosure, the controlling of the SSC Cruise Control is performed as stopping the SSC operation by recognizing the cruise Resume request as a SSC Resume request, confirming a current vehicle condition for entering a cruise with a current vehicle speed and a target vehicle speed, performing a cooperative control between the ESC and the transmission control unit, and controlling an engine for the cruise torque control.

In one form of the present disclosure, the cruise torque control is performed after the cooperative control at a value at which the current vehicle speed is greater than the target vehicle speed or performed without the cooperative control at a value at which the current vehicle speed is smaller than the target vehicle speed.

In one form of the present disclosure, the cooperative control is performed as performing, by the ESC, a braking by controlling a brake based on an ESC cooperative control request, driving the engine by switching the engine from an OFF state to an ON state, and engaging, by the transmission control unit, a clutch by controlling the clutch based on a transmission control unit cooperative control request.

In one form of the present disclosure, the ESC implements vehicle deceleration by controlling the brake until the current vehicle speed reaches the target vehicle speed, and the vehicle deceleration is implemented by lowering the current vehicle speed or implemented by lowering a transmission stage clutch speed at the current vehicle speed to the speed which is synchronized with a current engine Revolution Per Minute (RPM), by setting the target vehicle speed to a cruise target vehicle speed.

In addition, a cruise control system according to the present disclosure for achieving the object includes an engine control unit which controls a cruise torque of an engine by engaging a clutch in a state where a vehicle speed is decelerated under a control of a brake in the case of a NCC running or controls the cruise torque of the engine by engaging the clutch in a state where the engine is driven after the vehicle speed is decelerated under the control of the brake in the case of a SSC running, when a cruise Resume request of a vehicle is detected; a transmission control unit which engages a clutch by a control signal of the engine control unit; and an ESC which performs a brake control by a control signal of the engine control unit.

In one form of the present disclosure, the engine control unit performs the vehicle speed deceleration by using a vehicle speed or an engine Revolution Per Minute (RPM), and the vehicle speed deceleration is performed until reaching a set cruise target speed.

In one form of the present disclosure, the vehicle speed and the engine RPM are detected by a sensor to be provided to the engine control unit.

In one form of the present disclosure, the transmission control unit is a Transmission Control Unit (TCU).

In one form of the present disclosure, the vehicle is an intelligent Manual Transmission (iMT)-mounted vehicle or a 48V system hybrid vehicle which applies a Cruise Control.

The cruise operation fuel efficiency improvement control using the system cooperation which is implemented in the cruise control system according to the present disclosure implements the following operations and effects.

Firstly, by reflecting to the cruise Resume request the direct deceleration request state where has no driver's willingness to accelerate because the current vehicle speed of the vehicle is greater than the target vehicle speed, it is possible to improve the NCC or SSC-connected cruise algorithm. Secondly, by connecting the controls of the TCU and the ESC to the NCC operation or the SSC operation, it is possible to control the cruise torque when entering the cruise based on the Resume operation request. Thirdly, by performing the clutch control of the TCU after the current vehicle speed of the vehicle is set to the target vehicle speed by the ESC upon the Resume operation request of the NCC, it is possible to improve fuel efficiency by the level at which power waste is reduced in the NCC. Fourthly, by performing the clutch control of the TCU based on the engine operation after the current vehicle speed of the vehicle is set to the target vehicle speed by the ESC upon the Resume operation request of the SSC, it is possible to improve fuel efficiency by the level at which unnecessary engine driving is reduced in the SSC. Fifthly, by improving fuel efficiency in the NCC or SSC running state of the iMT-mounted vehicle and the 48V system vehicle which apply the Cruise Control, it is possible to improve merchantability of the vehicle.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 1A, 1B and 1C are a flowchart of a cruise operation fuel efficiency improvement control method using a system cooperation in one form of the present disclosure.

FIG. 3 is a diagram illustrating an operating state where the cruise control system in one form of the present disclosure performs the cruise operation fuel efficiency improvement control using the system cooperation.

Figure 1A:
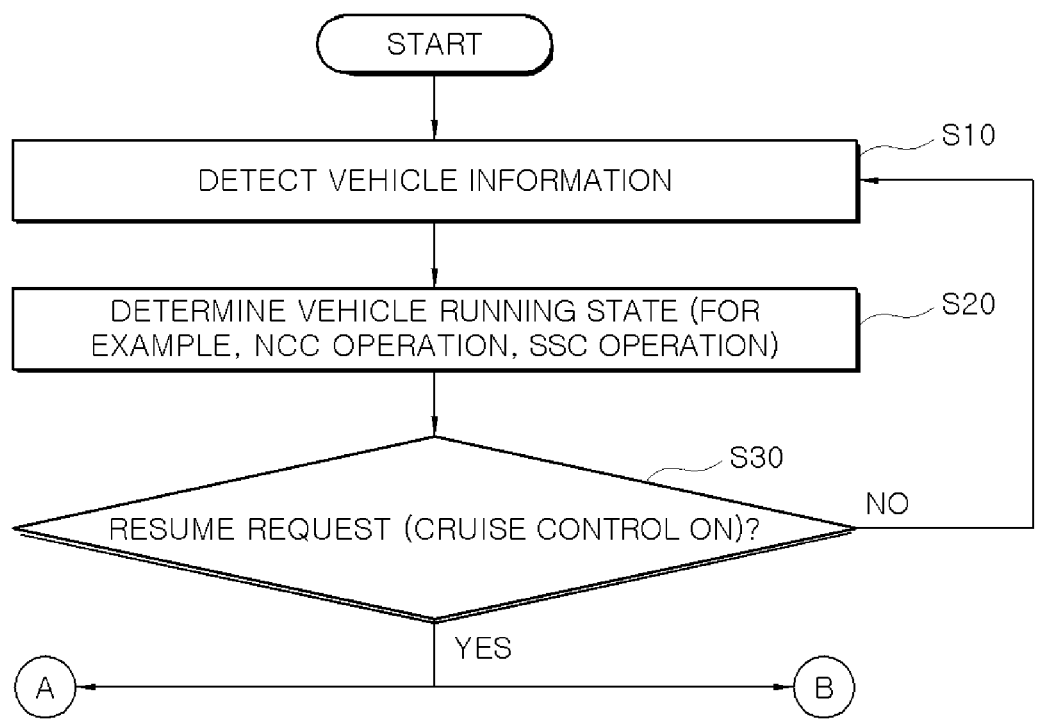

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1B:
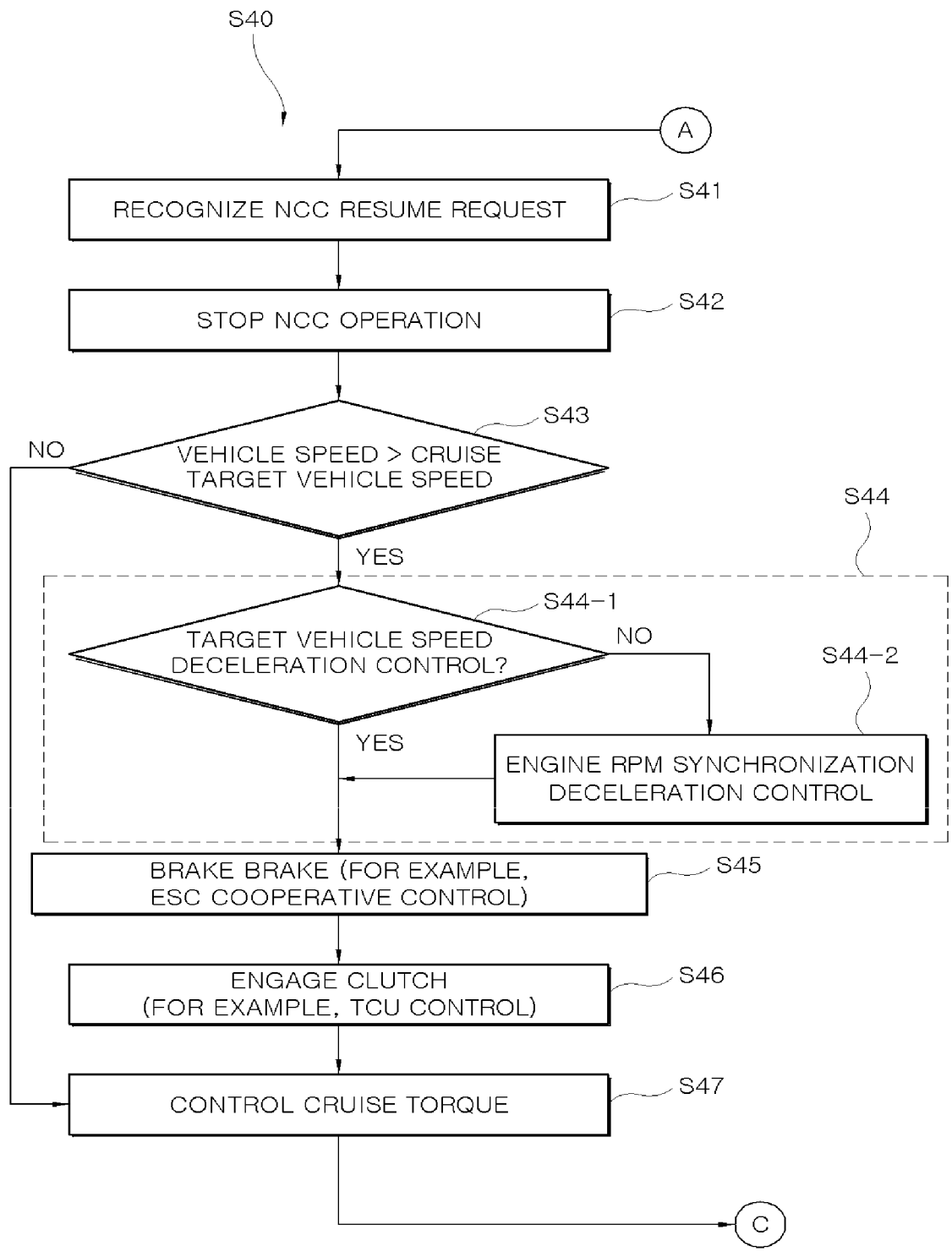

Referring to FIGS. 1A, 1B and 1C, when an engine control unit detects a cruise Resume request of a vehicle, a cruise operation fuel efficiency improvement control method includes a coasting running cooperative control which controls the cruise torque of an engine by engaging a clutch in a state where a vehicle speed is decelerated under a brake control in the case of a Neutral Control Coasting (NCC) running or controls the cruise torque of the engine by engaging the clutch in a state where the engine is driven after the vehicle speed is decelerated under the brake control in the case of a Start Stop Control (SSC) running.

For example, the coasting running cooperative control (S40 to S60) classifies the Resume request of the Cruise Control (S10 to S30) into controlling a NCC Cruise Control (S40 to S47) for the coasting running of the Neutral Control Coasting (NCC) or controlling a SSC Cruise Control (S50 to S57) for the coasting running of the Start Stop Control (SSC).

Particularly, the controlling of the NCC Cruise Control (S40 to S47) first performs an ESC cooperative control in a target vehicle speed deceleration control method or an engine RPM synchronization deceleration control method to reduce the difference between a current vehicle speed and a cruise target vehicle speed, and then performs a TCU control. In addition, the controlling of the SSC Cruise Control (S50 to S57) first performs the ESC cooperative control in the target vehicle speed deceleration control method or a clutch speed synchronization deceleration control method to reduce the difference between the current vehicle speed and the cruise target vehicle speed, and then performs the TCU control after operating an engine.

Accordingly, the cruise operation fuel efficiency improvement control method is characterized by a cruise operation fuel efficiency improvement control method using a system cooperation, which may perform a cruise operation after lowering the vehicle speed to the target speed under the ESC cooperative control or lowering the vehicle speed to the speed which is synchronized with a current engine Revolution Per Minute (RPM) under the ESC cooperative control upon the cruise Resume request during the NCC operation, and may turn on the engine and perform the cruise operation after lowering the vehicle speed to the target speed under the ESC cooperative control or lowering the vehicle speed to a certain value under the ESC cooperative control upon the cruise Resume request during the SSC operation.

Accordingly, the cruise operation fuel efficiency improvement control method using the system cooperation may reduce unnecessary engine driving time and power waste through the cooperative control with any one of the engine control unit, the TCU, and the ESC, thereby improving fuel efficiency, which is the direct deceleration request of the driver, and prevents the unnecessary engine driving and engine power waste of the existing strategy, which engages the clutch by increasing the engine RPM immediately upon the cruise Resume request in the state where the vehicle speed having no willingness to accelerate is higher than the target speed, from occurring.

Figure 2:
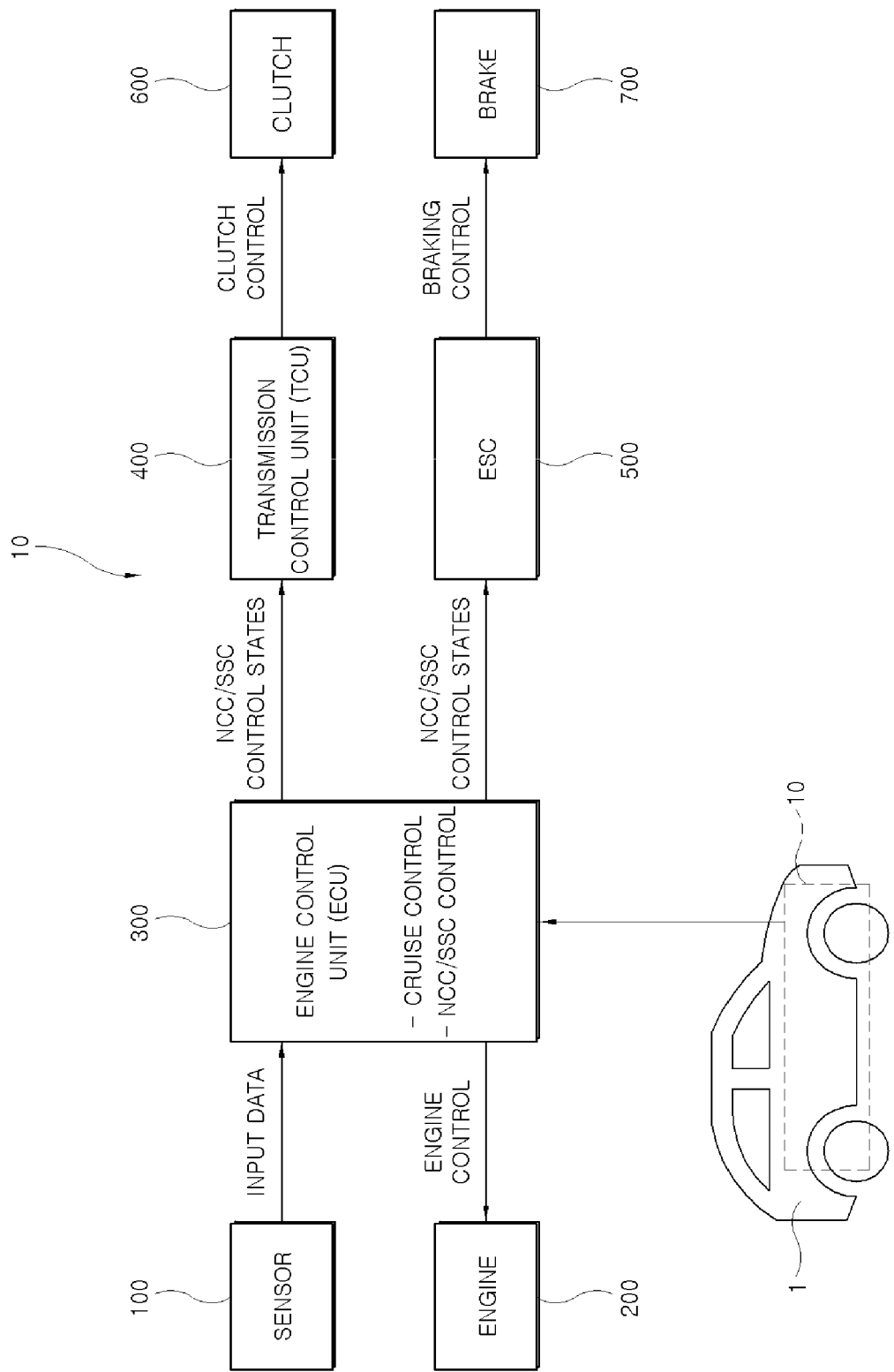
FIG. 2 is a diagram illustrating an example of a cruise control system in which the cruise operation fuel efficiency improvement control using the system cooperation in one form of the present disclosure is implemented.

Referring to FIG. 2, a cruise control system 10 which is applied to a vehicle 1 includes a sensor 100, an engine control unit 300, a transmission control unit 400, and an Electronic Stability Control (ESC) 500.

For example, the vehicle 1 is an iMT-mounted vehicle and a 48V system vehicle which apply a gasoline engine or a diesel engine as an engine 200, and apply a Cruise Control to improve vehicle fuel efficiency upon coasting running by the NCC or the SSC. In this case, the 48V system vehicle is a mild hybrid electric vehicle having a 48V MHSG system. The iMT-mounted vehicle is a vehicle to which an intelligent Manual Transmission (iMT), which is a type of manual transmission in which the Transmission Control Unit (TCU) may electronically control to connect and disconnect the clutch without a clutch pedal, is applied, and a vehicle which may implement the NCC and the SSC by enabling the clutch control of the TCU.

For example, the sensor 100 is installed to the vehicle 1 to measure the vehicle speed and the engine RPM of the engine 200, and to provide the measured value to the engine control unit 300 as input data. In this case, the input data includes an engine torque, engine ON/OFF signals, clutch ON/OFF signals, NCC or SSC ON/OFF signals, Cruise Control ON/OFF signals, an accelerator pedal signal, and a brake pedal signal, and a sensor or logic for them is used.

For example, the engine control unit 300 performs the NCC and SSC control of the vehicle 1, performs the NCC or SSC control in consideration of a vehicle state which is received from the sensor 100 and the like, performs the cooperative control with the transmission control unit 400 configured to control the engagement of a clutch 600 and the ESC 500 configured to control the braking of the brake 700 upon the cruise Resume request required by the driver by the current vehicle state and a Cruise Control button (not illustrated) during the NCC or SSC control, and performs a cruise torque control after the clutch 600 is engaged. In this case, the engine control unit 300, the transmission control unit 400, and the ESC 500 communicate with each other through a Controller Area Network (CAN).

To this end, the engine control unit 300 includes a program or an algorithm for the controlling of the NCC Cruise Control (S40) and the controlling of the SSC Cruise Control (S50), which is mounted in a memory, and is operated by a Central Processing Unit which implements a logic processing of the program or the algorithm.

For example, the transmission control unit 400 performs the engagement/Open/Slip control for the clutch 600, and may be a separate controller but preferably applies a Transmission Control Unit (TCU). In this case, the clutch 600 is disposed between the engine 200 and the transmission (not illustrated). The ESC 500 stabilizes the vehicle upon braking by controlling the braking state for the brake 700 of the vehicle 1, and is applied to the vehicle 1 as the ESC system. In this case, the brake 700 includes a caliper, a drum brake, or the like which brakes the wheel of the vehicle 1.

Hereinafter, the cruise operation fuel efficiency improvement control method illustrated in FIGS. 1A, 1B and 1C will be described in detail with reference to FIG. 3. In this case, the control subject is the engine control unit 300, and the control targets are the engine 200, the transmission control unit 400, and the ESC 500.

First, the engine control unit 300 performs the Resume request of the Cruise Control (S10 to S30) as detecting vehicle information (S10), determining a vehicle running state (S20), and performing a Resume request (S30).

Referring to FIG. 3, the engine control unit 300 performs the detecting of the vehicle information (S10) by reading, as input data, a vehicle speed, an engine RPM, an engine torque, engine ON/OFF signals, clutch ON/OFF signals, NCC or SSC ON/OFF signals, Cruise Control ON/OFF signals, and the like. Subsequently, the engine control unit 300 performs the determining of the vehicle running state (S20) by confirming whether the current vehicle 1 is in the NCC operation or SSC operation state from the input data by using the vehicle speed and the engine RPM of the sensor 100 as the primary parameters. Finally, the engine control unit 300 confirms the performing of the Resume request (S30) through the Cruise Control ON signal, the accelerator pedal signal, or the brake pedal signal.

Subsequently, the engine control unit 300 performs the controlling of the NCC Cruise Control (S40) as recognizing the NCC Resume request (S41), stopping the NCC operation (S42), confirming the current vehicle condition (S43), operating the Resume from above (S44), braking the brake (S45), engaging the clutch (S46), and controlling the cruise torque (S47).

Referring to FIG. 3, the engine control unit 300 performs the stopping of the NCC operation (S42) by the recognizing of the Resume request (S41) during the NCC control and then performs the confirming of the current vehicle condition (S43) with respect to the system cooperative control between the engine 200, the transmission control unit 400, and the ESC 500.

For example, the confirming of the current vehicle condition (S43) is implemented through the following vehicle running speed determination expression.

Vehicle running speed determination expression: vehicle speed>target vehicle speed?

where the vehicle speed refers to the current vehicle speed of the vehicle 1, the target vehicle speed refers to a cruise target vehicle speed and the vehicle running speed which is set by the Cruise Control or an Eco running speed in terms of fuel efficiency, and ">" refers to an inequality sign indicating the magnitude relationship between the two values.

As a result, when the vehicle speed is smaller than the target vehicle speed, the engine control unit 300 increases the vehicle speed of the vehicle 1 by switching the process to the controlling of the cruise torque (S47) due to the driver's willingness to accelerate. On the other hand, when the vehicle speed is greater than the target vehicle speed, the engine control unit 300 considers by reflecting to the Cruise Control the direct deceleration request of the driver who has no willingness to accelerate by switching the process to the performing of the Resume from above operation (S44) due to the driver's willingness not to accelerate.

For example, the performing of the Resume from above operation (S44) is classified into a target vehicle speed deceleration control (S44-1) or an engine RPM synchronization deceleration control (S44-2). The target vehicle speed deceleration control (S44-1) is a method of lowering the current speed of the vehicle 1 to a set target speed under the cooperative control with the ESC 500, and the engine RPM synchronization deceleration control (S44-2) is a method of lowering the transmission stage clutch speed at the current speed of the vehicle 1 to the speed which is synchronized with the current engine RPM under the cooperative control with the ESC 500.

Particularly, the engine RPM synchronization deceleration control (S44-2) is determined by confirming the control state of the transmission control unit 400 by the engine control unit 300, unlike the target vehicle speed deceleration control (S44-1) determined by the engine control unit 300. However, the engine control unit 300 may select the target vehicle speed deceleration control (S44-1) and the engine RPM synchronization deceleration control (S44-2) by the condition which may engage the clutch as fast as possible in consideration of the current running condition of the vehicle 1.

For example, the braking of the brake (S45) is a state where the braking is performed by setting the current speed of the vehicle 1 in which the NCC operation is stopped to the target vehicle speed deceleration control (S44-1) or the engine RPM synchronization deceleration control (S44-2). Subsequently, the engaging of the clutch (S46) is a state where the clutch is engaged after the vehicle speed reaches the target vehicle speed or the RPM synchronization is performed by the braking of the brake (S45). Finally, the controlling of the cruise torque (S47) is a state where the vehicle becomes the Cruise Control after the vehicle speed of the vehicle 1 is set to the cruise target vehicle speed.

Referring to FIG. 3, the engine control unit 300 requests the ESC cooperative control based on the target vehicle speed deceleration control (S44-1) or the engine RPM synchronization deceleration control (S44-2) so that the ESC 500 performs the braking control with being out of the NCC control. Subsequently, the engine control unit 300 requests the TCU cooperative control so that the transmission control unit 400 performs the clutch control with being out of the NCC control. Finally, the engine control unit 300 controls the engine 200 in a state where the engine and the clutch are engaged.

Then, the ESC 500 controls the brake 700 of the vehicle 1, such that the vehicle 1 lowers the current speed based on the NCC operation to the set target speed or lowers the transmission stage clutch speed to the engine RPM synchronization speed. Subsequently, the transmission control unit 400 connects the engine 200 to a transmission (not illustrated) by engaging the clutch 600 (for example, engine clutch) of the vehicle 1.

Finally, the engine control unit 300 controls the engine 200 in the Cruise Control state, such that the output of the engine 200 is controlled in the cruise torque control state.

Meanwhile, the engine control unit 300 performs the controlling of the SSC Cruise Control (S50) as recognizing a SSC Resume request (S51), stopping a SSC operation (S52), confirming a current vehicle condition (S53), performing a Resume from above operation (S54), braking a brake (S55), driving an engine (S55-1), engaging a clutch (S56), and controlling a cruise torque (S57).

Referring to FIG. 3, the engine control unit 300 performs the stopping of the SSC operation (S52) by the recognizing of the Resume request (S51) during the SSC control and then performs the confirming of the current vehicle condition (S53) with respect to the system cooperative control between the engine 200, the transmission control unit 400, and the ESC 500.

For example, the confirming of the current vehicle condition (S53) is performed through the following vehicle running speed determination expression.

Vehicle running speed determination expression: vehicle speed>target vehicle speed?

where the vehicle speed refers to the current vehicle speed of the vehicle 1, the target vehicle speed refers to the cruise target vehicle speed and the vehicle running speed which is set by the Cruise Control or the Eco running speed in terms of fuel efficiency, and ">" refers to an inequality sign indicating the magnitude relationship between the two values.

As a result, when the vehicle speed is smaller than the target vehicle speed, the engine control unit 300 increases the vehicle speed of the vehicle 1 by switching the process to the controlling of the cruise torque (S57) due to the driver's willingness to accelerate. On the other hand, when the vehicle speed is greater than the target vehicle speed, the engine control unit 300 reflects to the Cruise Control the direct deceleration request of the driver who has no willingness to accelerate by switching the process to the performing of the Resume from above operation (S54) due to the driver's willingness not to accelerate.

For example, the performing of the Resume from above operation (S54) is classified into a target vehicle speed deceleration control (S54-1) or an engine RPM synchronization deceleration control (S54-2). The target vehicle speed deceleration control (S54-1) is a method of lowering the current speed of the vehicle 1 to a set target speed under a cooperative control with the ESC 500, and the engine RPM synchronization deceleration control (S54-2) is a method of lowering the transmission stage clutch speed at the current speed of the vehicle 1 to the speed which is synchronized with the current engine RPM under the cooperative control with the ESC 500.

Particularly, the engine RPM synchronization deceleration control (S54-2) is determined by confirming the control state of the transmission control unit 400 by the engine control unit 300, unlike the target vehicle speed deceleration control (S54-1) determined by the engine control unit 300. However, the engine control unit 300 may select the target vehicle speed deceleration control (S54-1) and the engine RPM synchronization deceleration control (S54-2) by the condition which may engage the clutch as fast as possible in consideration of the current running condition of the vehicle 1.

For example, the braking of the brake (S55) is a state where the braking is performed by setting the current speed of the vehicle 1 in which the NCC operation is stopped to the target vehicle speed deceleration control (S54-1) or the engine RPM synchronization deceleration control (S54-2).

Referring to FIG. 3, the engine control unit 300 requests the ESC cooperative control based on the target vehicle speed deceleration control (S54-1) or the engine RPM synchronization deceleration control (S54-2) so that the ESC 500 performs the braking control with being out of the SSC control.

Then, the ESC 500 controls the brake 700 of the vehicle 1, such that the vehicle 1 lowers the current speed based on the SSC operation to the set target speed or lowers the transmission stage clutch speed to the engine RPM synchronization speed.

For example, the driving of the engine (S55-1) is a state where the engine 200 is operated (engine switching from OFF to ON) after the vehicle speed is set to the cruise target vehicle speed. The engaging of the clutch (S56) is a state where the clutch is engaged after the vehicle speed reaches the target vehicle speed or the RPM synchronization is performed by the braking of the brake (S55). Finally, the controlling of the cruise torque (S57) is a state where the vehicle becomes the Cruise Control after the vehicle speed of the vehicle 1 is set to the cruise target vehicle speed.

Referring to FIG. 3, the engine control unit 300 operates the engine by transmitting an engine ON signal to the engine 200 so that the engine 200 is operated (engine ON) in the stopped (engine OFF) state. Subsequently, the engine control unit 300 requests the TCU cooperative control so that the transmission control unit 400 performs the clutch control with being out of the SSC control. Finally, the engine control unit 300 controls the engine 200 during operation in the state where the engine and the clutch are engaged.

Then, the transmission control unit 400 connects the engine 200 during operation to a transmission (not illustrated) by engaging the clutch 600 (for example, engine clutch) of the vehicle 1. Finally, the engine control unit 300 controls the engine 200 during operation in the Cruise Control state, such that the output of the engine 200 is controlled in the cruise torque control state.

As described above, the cruise operation fuel efficiency improvement control method using the system cooperation which is applied to the cruise control system 10 in some forms of the present disclosure may control, by the engine control unit 300, the cruise torque of the engine 200 by engaging the clutch in the state where the vehicle speed is decelerated under the control of the brake 700 in the case of the Neutral Control Coasting (NCC) running or control the cruise torque of the engine 200 by engaging the clutch in the state where the engine 200 is driven after the vehicle speed is decelerated under the control of the brake 700 in the case of the Start Stop Control (SSC) running when the cruise Resume request of the vehicle 1 is detected, thereby reducing the unnecessary engine driving in the SSC while reducing the power waste in the NCC with respect to the direct deceleration request of the driver who has no willingness to accelerate to improve fuel efficiency.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A cruise operation fuel efficiency improvement control method, the method comprising:
    detecting, by an engine control unit, a cruise Resume request during a coasting running of a vehicle;
    when the coasting running is a Neutral Control Coasting (NCC), controlling a NCC Cruise Control which performs a cruise torque control of the vehicle after controlling an Electronic Stability Control (ESC), wherein the ESC sets a vehicle speed to a cruise target speed followed by controlling a transmission control unit; and
    when the coasting running is a Start Stop Control (SSC), controlling a SSC Cruise Control which performs the cruise torque control of the vehicle after controlling the Electronic Stability Control (ESC).

2. The method of claim 1, wherein the method comprises:
    controlling, by the ESC, a brake in cooperation with the engine control unit; and
    controlling, by the transmission control unit, a clutch in cooperation with the engine control unit.

3. The method of claim 1, wherein the transmission control unit is a Transmission Control Unit (TCU).

4. The method of claim 1, wherein the controlling of the NCC Cruise Control includes:
    stopping the NCC operation by determining that the cruise Resume request is a NCC Resume request;

confirming a current vehicle condition for entering a cruise;
performing a cooperative control between the ESC and the transmission control unit; and
controlling an engine for a cruise torque.

5. The method of claim 4, wherein the confirming of the current vehicle condition includes:
applying the current vehicle speed and a target vehicle speed.

6. The method of claim 5, wherein the controlling of the cruise torque includes:
controlling the cruise torque after the cooperative control at a value at which the current vehicle speed is greater than the target vehicle speed; or controlling the cruise torque without the cooperative control at a value at which the current vehicle speed is less than the target vehicle speed.

7. The method of claim 6, wherein the performing of the cooperative control includes:
performing, by the ESC, a braking by controlling a brake based on an ESC cooperative control request; and
engaging, by the transmission control unit, a clutch by controlling the clutch based on a transmission control unit cooperative control request.

8. The method of claim 7, wherein the performing of the braking includes:
performing, by the ESC, a vehicle deceleration by controlling the brake until the current vehicle speed reaches the target vehicle speed.

9. The method of claim 8, wherein the performing of the vehicle deceleration includes:
lowering the current vehicle speed or a transmission stage clutch speed at the current vehicle speed to the speed which is synchronized with a current engine Revolution Per Minute (RPM); and
setting the target vehicle speed to a cruise target vehicle speed.

10. The method of claim 1, wherein the controlling of the SSC Cruise Control includes:
stopping the SSC operation by determining that the cruise Resume request is a SSC Resume request;
confirming a current vehicle condition for entering a cruise;
performing a cooperative control between the ESC and the transmission control unit; and
controlling an engine for the cruise torque.

11. The method of claim 10, wherein the confirming of the current vehicle condition includes:
applying the current vehicle speed and a target vehicle speed.

12. The method of claim 11, wherein the controlling of the cruise torque includes:
controlling the cruise torque after the cooperative control at a value at which the current vehicle speed is greater than the target vehicle speed; and
controlling the cruise torque without the cooperative control at a value at which the current vehicle speed is smaller than the target vehicle speed.

13. The method of claim 11, wherein the performing of the cooperative control includes:
performing, by the ESC, a braking by controlling a brake based on an ESC cooperative control request;
driving the engine by switching the engine from an OFF state to an ON state; and
engaging, by the transmission control unit, a clutch by controlling the clutch based on a transmission control unit cooperative control request.

14. The method of claim 13, wherein the performing of the braking includes:
performing, by the ESC, a vehicle deceleration by controlling the brake until the current vehicle speed reaches the target vehicle speed.

15. The method of claim 14, wherein the performing of the vehicle deceleration includes:
lowering the current vehicle speed or a transmission stage clutch speed at the current vehicle speed to the speed which is synchronized with a current engine Revolution Per Minute (RPM); and
setting the target vehicle speed to a cruise target vehicle speed.

16. A cruise control system comprising:
a transmission control unit,
a sensor configured to detect a vehicle speed and an engine RPM;
an electronic stability control (ESC), and
an engine control unit, the engine control unit configured to receive the vehicle speed and the engine RPM from the sensor, the engine control unit configured to:
detect a cruise Resume request during a coasting running of a vehicle;
when the coasting running is a Neutral Control Coasting (NCC), control a NCC Cruise Control which performs a cruise torque control of the vehicle after controlling the ESC, wherein the ESC sets the vehicle speed to a cruise target speed followed by controlling the transmission control unit; and
when the coasting running is a Start Stop Control (SSC), control a SSC Cruise Control which performs the cruise torque control of the vehicle after controlling the ESC.

17. The cruise control system of claim 16, wherein the engine control unit is configured to:
perform a vehicle speed deceleration by using the vehicle speed or the engine Revolution Per Minute (RPM); and
perform the vehicle speed deceleration until reaching a set cruise target speed, wherein the transmission control unit is a Transmission Control Unit (TCU).

18. The cruise control system of claim 16, wherein the vehicle is an intelligent Manual Transmission (iMT)-mounted vehicle or a 48V system hybrid vehicle which applies a Cruise Control.

* * * * *